United States Patent
Lee et al.

(10) Patent No.: US 7,254,587 B2
(45) Date of Patent: Aug. 7, 2007

(54) METHOD AND APPARATUS FOR DETERMINING RELATIVE RELEVANCE BETWEEN PORTIONS OF LARGE ELECTRONIC DOCUMENTS

(75) Inventors: Chris Guo Lee, Austin, TX (US); Anmol Neelammna Matada, Austin, TX (US); Ningning Wang, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 578 days.

(21) Appl. No.: 10/755,818

(22) Filed: Jan. 12, 2004

(65) Prior Publication Data
US 2005/0154761 A1    Jul. 14, 2005

(51) Int. Cl.
*G06F 17/00* (2006.01)
*G06F 15/00* (2006.01)

(52) U.S. Cl. .................. 707/104.1; 707/1; 707/100; 707/104.1; 707/200; 715/511

(58) Field of Classification Search .............. 707/3, 707/5, 8, 10; 704/7, 9; 715/500, 511
See application file for complete search history.

(56) References Cited

U.S. PATENT DOCUMENTS

| | | | |
|---|---|---|---|
| 5,263,159 A * | 11/1993 | Mitsui | 707/5 |
| 6,978,420 B2 * | 12/2005 | Ching | 715/511 |
| 2003/0140309 A1 * | 7/2003 | Saito et al. | 715/500 |
| 2003/0177124 A1 * | 9/2003 | Sauri | 707/10 |

\* cited by examiner

*Primary Examiner*—John Breene
*Assistant Examiner*—Fred I. Ehichioya
(74) *Attorney, Agent, or Firm*—Duke W. Yee; Marilyn Smith Dawkins; Wayne P. Bailey

(57) ABSTRACT

A technique for determining the relative relevance of electronic documents based on metadata/content associated with the document as a whole and/or metadata/content associated with one or more subdivisions of the electronic document. Metadata is associated with the document and various subdivision markers in the code of the document. A comparison of electronic documents may be made by comparing the metadata/content associated with the document and/or the subdivisions of the document to determine which documents contains subject matter that is relevant to the subject matter of another document or search criteria. The metadata/content may be weighted and these weights may be modified based on a rank profile. A relevance score may be determined based on the comparison of the metadata/content for the documents and/or subdivisions of the documents as well as the weights attributed to the various subdivisions and documents.

12 Claims, 4 Drawing Sheets

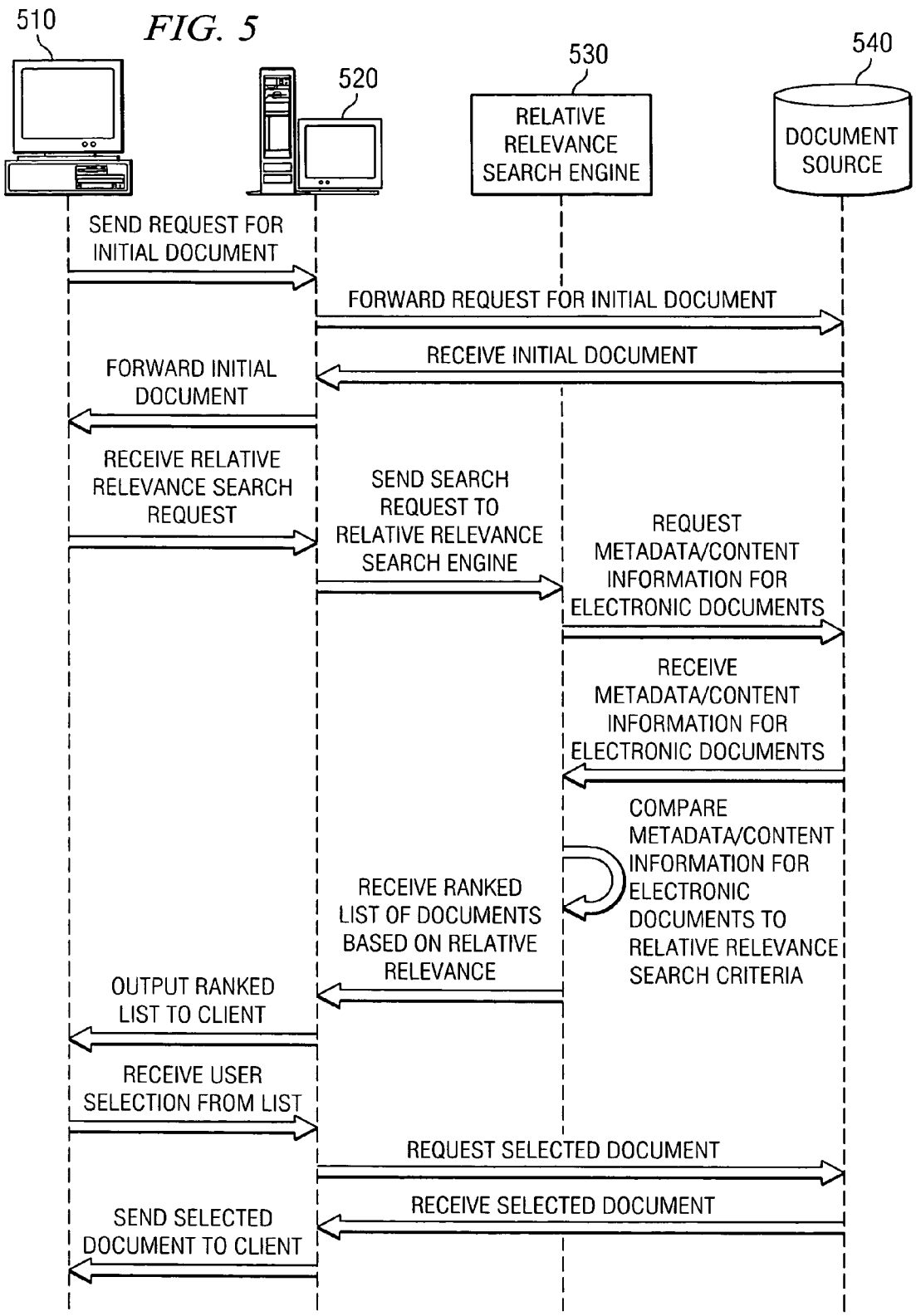

METHOD AND APPARATUS FOR DETERMINING RELATIVE RELEVANCE BETWEEN PORTIONS OF LARGE ELECTRONIC DOCUMENTS

BACKGROUND OF THE INVENTION

1. Technical Field

The present invention is generally directed to an improved computing system. More specifically, the present invention is directed to a method and apparatus for determining the relative relevance between portions of large electronic documents.

2. Description of Related Art

With the present information age, access to literature has become increasingly easy to obtain. As literature is moved from a physical format to an electronic format, more people are being able to gain access to the information contained in this literature through the use of computers, networks, the Internet, and the like.

Being able to compare literature, e.g., books, articles, magazines, etc., and determine the relevance of one piece of literature to another, has been a valuable tool for identifying other pieces of literature that may be of interest to a reader. Traditionally, this was done in a manual manner such as through a manual cataloging scheme. Typically, these manual cataloging schemes use general topics, author names, title words, and the like, to determine which pieces of literature are most like one another and to categorize them in a similar category.

Manual comparisons are extremely time consuming when the number of documents, e.g., books, being compare are huge and usually are subject to personal biases. When a cataloging system is utilized, manual comparisons further require a detailed understanding of the cataloging system by the person performing the comparison of the documents so that the appropriate categories for the documents are selected.

In recent years, as literature has been moved from physical books, magazines and the like, to electronic documents, techniques have been devised to perform comparisons of electronic documents based on small standardized portions of the electronic document. For example, electronic documents typically will include an abstract and the comparison between documents is made based on this abstract.

Abstract-based comparisons are extremely unreliable as the entire electronic document, e.g., an electronic book, contains far more information than what is contained in the abstract. Thus, the book may have portions that are applicable to many different other types of books, yet the comparison of abstracts may not accurately reflect this fact. Furthermore, two electronic documents may have the same abstract, yet contain entirely different contents.

Thus, it would be desirable to have an automated system that performs a comprehensive comparison of an electronic document with other electronic documents to generate comparison results indicating the relative relevance of the documents to one another. Moreover, it would be beneficial to provide such a comprehensive comparison with on-line electronic documents as part of a search engine for finding additional electronic documents and provide a ranking of the relative relevance of the additional electronic documents.

SUMMARY OF THE INVENTION

The present invention provides a mechanism for determining the relative relevance of electronic documents based on metadata associated with the document as a whole and/or metadata associated with one or more subdivisions of the electronic document. With the mechanism of the present invention, metadata is associated with the document and various subdivision markers in the code of the document. A comparison of electronic documents may be made by comparing the metadata associated with the document and/or the subdivisions of the document to determine which documents contains subject matter that is relevant to the subject matter of another document or search criteria. In addition, a comparison of the actual content of the document or selected subdivisions of the document may be performed and, along with the comparison of the metadata, a determination as to the relevance of the documents or subdivisions of the documents may be made.

The metadata and/or content associated with the document and/or subdivisions may be provided with default weights that are assigned to the document and/or subdivisions. These default weights are used to calculate a score indicating the relative relevance of the documents to one another.

The default weights may further be modified by weight modifiers provided in a rank profile that may be established by a relative relevance search engine provider or may be customized by users to their specific needs. This rank profile may designate a modifier of weights for the document and/or subdivisions of the document. These modifiers may be, for example, replacement weights, modifiers to the default weights, or the like, for the document and/or subdivisions of the document. The modifiers may be associated with a document and/or subsection type such that paragraphs may be weighted less than chapters which are weighted less than entire documents, for example. In this way, a relevance score may be determined based on the comparison of the metadata and/or content for the documents and/or subdivisions of the documents, the weights associated with the metadata and/or content, as well as the weight modifiers attributed to the various subdivisions.

The scores determined for the documents represent the relative relevance of the documents to the initial or base document or search criteria. The scores may be used to create a ranked list of documents based on their relative relevance. This ranked list may be provided to a user of a client device thereby indicating which documents are more relevant to an initial or base document or search criteria. From this list, a document may be selected for retrieval. The selected document may then be retrieved and presented to a user via the client device.

These and other features and advantages of the present invention will be described in, or will become apparent to those of ordinary skill in the art in view of, the following detailed description of the preferred embodiments.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 5 is an exemplary message flow in accordance with one exemplary embodiment of the present invention;

DETAILED DESCRIPTION OF THE PREFERRED EMBODIMENTS

The present invention provides a mechanism for comparing electronic documents based on metadata and content associated with sections of the electronic documents in order to obtain a relative relevance of the electronic documents. Since the present invention is directed to the identification of electronic documents that are most relevant to an initial electronic document or portion of content, the present invention is especially suited to a distributed data processing environment in which there may be a large library of electronic documents available, e.g., the Internet. As such, in order to provide a context for the description of the present invention, FIGS. 1-3 are offered as a brief overview of a distributed data processing environment and some of the computing devices that are part of this distributed data processing environment in which aspects of the present invention may be implemented.

Figure 1:
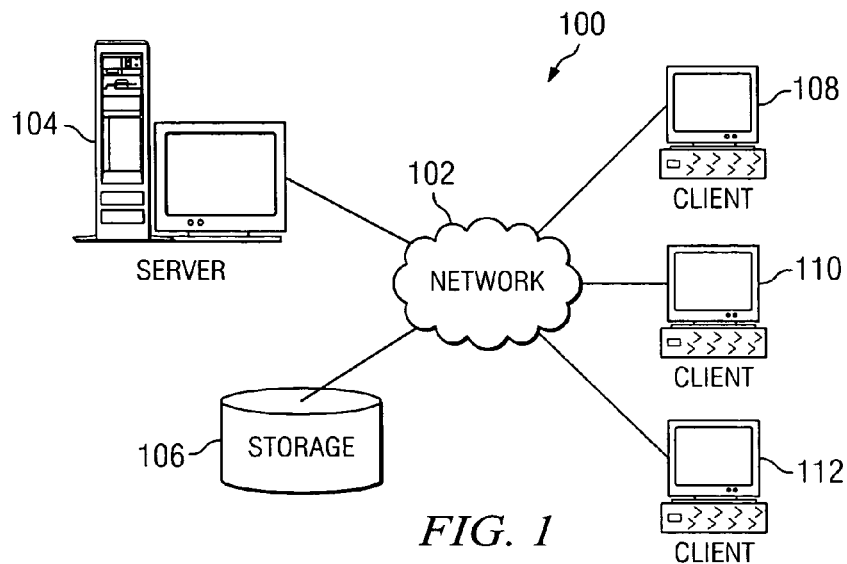
FIG. 1 is an exemplary diagram of a distributed data processing system in which the present invention may be implemented.

With reference now to the figures, FIG. 1 depicts a pictorial representation of a network of data processing systems in which the present invention may be implemented. Network data processing system 100 is a network of computers in which the present invention may be implemented. Network data processing system 100 contains a network 102, which is the medium used to provide communications links between various devices and computers connected together within network data processing system 100. Network 102 may include connections, such as wire, wireless communication links, or fiber optic cables.

In the depicted example, server 104 is connected to network 102 along with storage unit 106. In addition, clients 108, 110, and 112 are connected to network 102. These clients 108, 110, and 112 may be, for example, personal computers or network computers. In the depicted example, server 104 provides data, such as boot files, operating system images, and applications to clients 108-112. Clients 108, 110, and 112 are clients to server 104. Network data processing system 100 may include additional servers, clients, and other devices not shown. In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, government, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the present invention.

Figure 2:
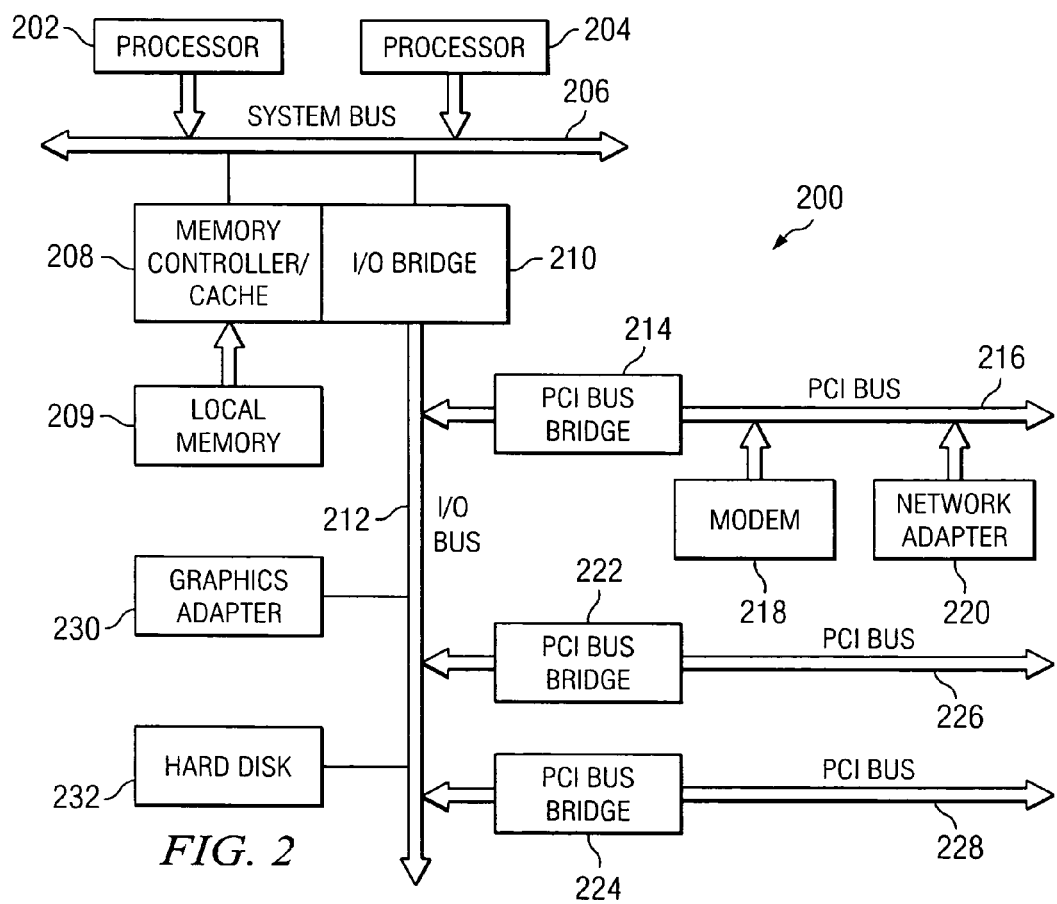
FIG. 2 is an exemplary block diagram of a server computing device in which aspects of the present invention may be implemented.
Figure 3:
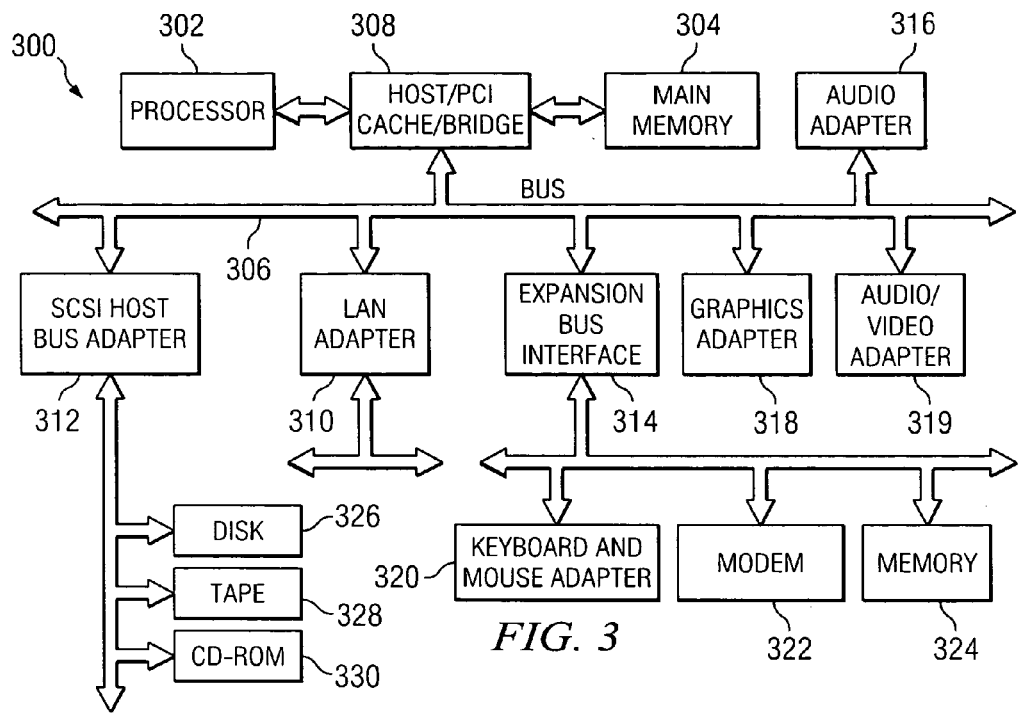
FIG. 3 is an exemplary block diagram of a client computing device in which aspects of the present invention may be implemented.

Referring to FIG. 2, a block diagram of a data processing system that may be implemented as a server, such as server 104 in FIG. 1, is depicted in accordance with a preferred embodiment of the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI local bus 216. Typical PCI bus implementations will support four PCI expansion slots or add-in connectors. Communications links to clients 108-112 in FIG. 1 may be provided through modem 218 and network adapter 220 connected to PCI local bus 216 through add-in boards.

Additional PCI bus bridges 222 and 224 provide interfaces for additional PCI local buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM eServer pSeries system, a product of International Business Machines Corporation in Armonk, N.Y., running the Advanced Interactive Executive (AIX) operating system or LINUX operating system.

With reference now to FIG. 3, a block diagram illustrating a data processing system is depicted in which the present invention may be implemented. Data processing system 300 is an example of a client computer. Data processing system 300 employs a peripheral component interconnect (PCI) local bus architecture. Although the depicted example employs a PCI bus, other bus architectures such as Accelerated Graphics Port (AGP) and Industry Standard Architecture (ISA) may be used. Processor 302 and main memory 304 are connected to PCI local bus 306 through PCI bridge 308. PCI bridge 308 also may include an integrated memory controller and cache memory for processor 302. Additional connections to PCI local bus 306 may be made through direct component interconnection or through add-in boards. In the depicted example, local area network (LAN) adapter 310, SCSI host bus adapter 312, and expansion bus interface 314 are connected to PCI local bus 306 by direct component connection. In contrast, audio adapter 316, graphics adapter 318, and audio/video adapter 319 are connected to PCI local bus 306 by add-in boards inserted into expansion slots.

Expansion bus interface 314 provides a connection for a keyboard and mouse adapter 320, modem 322, and additional memory 324. Small computer system interface (SCSI) host bus adapter 312 provides a connection for hard disk drive 326, tape drive 328, and CD-ROM drive 330. Typical PCI local bus implementations will support three or four PCI expansion slots or add-in connectors.

An operating system runs on processor 302 and is used to coordinate and provide control of various components within data processing system 300 in FIG. 3. The operating system may be a commercially available operating system, such as Windows XP, which is available from Microsoft Corporation. An object oriented programming system such as Java may run in conjunction with the operating system and provide calls to the operating system from Java programs or applications executing on data processing system 300. "Java" is a trademark of Sun Microsystems, Inc. Instructions for the operating system, the object-oriented programming system, and applications or programs are located on storage devices, such as hard disk drive 326, and may be loaded into main memory 304 for execution by processor 302.

Those of ordinary skill in the art will appreciate that the hardware in FIG. 3 may vary depending on the implementation. Other internal hardware or peripheral devices, such as flash read-only memory (ROM), equivalent nonvolatile memory, or optical disk drives and the like, may be used in addition to or in place of the hardware depicted in FIG. 3. Also, the processes of the present invention may be applied to a multiprocessor data processing system.

As another example, data processing system 300 may be a stand-alone system configured to be bootable without relying on some type of network communication interface. As a further example, data processing system 300 may be a personal digital assistant (PDA) device, which is configured with ROM and/or flash ROM in order to provide non-volatile memory for storing operating system files and/or user-generated data.

The depicted example in FIG. 3 and above-described examples are not meant to imply architectural limitations. For example, data processing system 300 also may be a notebook computer or hand held computer in addition to taking the form of a PDA. Data processing system 300 also may be a kiosk or a Web appliance.

The present invention provides a mechanism for determining the relative relevance of electronic documents based on metadata associated with the document as a whole and/or metadata associated with one or more subdivisions of the electronic document. In addition, the content of the documents and/or selected subdivisions of the documents may be compared and, along with the comparisons of the metadata, an overall measure of relative relevance of two or more electronic documents may be determined.

With the mechanism of the present invention, metadata is associated with the document and various subdivision markers in the code of the document. A comparison of electronic documents may be made by comparing the metadata associated with the document and/or the subdivisions of the document to determine which documents contains subject matter that is relevant to the subject matter of another document or search criteria. In addition, the actual content of the document or subdivisions of the document may be compared along with the metadata to determine which documents contain subject matter that is relevant to the subject matter of another document or search criteria.

In a preferred embodiment, subsections of the documents, and portions of metadata associated with the subsections of the documents, have associated default weights that are assigned by a provider of the documents. The total for all weights of subsections and metadata for a document should sum to a standardized value, e.g., 100, 1.0, or the like. These weights are used to determine a relative relevance of the various subsections of the document to a matching criteria.

The weights for the metadata associated with the document and/or subdivisions and the weights for the content of the document and/or subdivisions may be adjusted based on modifiers provided in a rank profile that may be established by a relative relevance search engine provider or may be customized by users to their specific needs. This rank profile may designate the weight modifiers to be adjustments to the weights involved in a relevance comparison, may designate alternative or replacement weights, or the like. The weight modifiers may be associated with a document and/or subsection type such that paragraphs may be weighted less than chapters which are weighted less than entire documents, for example. In this way, a relevance score may be determined based on the weights of the metadata and content for the documents and/or subdivisions of the documents as well as the weight adjustments attributed to the document and/or the various subdivisions and metadata.

The scores determined for the documents represent the relative relevance of the documents to the initial or base document or search criteria. The scores may be used to create a ranked list of documents based on their relative relevance. This ranked list may be provided to a user of a client device thereby indicating which documents are more relevant to an initial or base document or search criteria. From this list, a document may be selected for retrieval. The selected document may then be retrieved and presented to a user via the client device.

With the present invention, electronic documents are created using a-markup language, such as Extended Markup Language (XML), Hypertext Markup Language (HTML), or the like. The code of the electronic document includes tags that designate the subsections of the electronic document. These tags may designate, for example, chapters, sections, pages, paragraphs, etc.

In a preferred embodiment, these electronic documents are large electronic documents such as electronic books, magazines, and the like. However, the present invention is not limited to such. Rather, any electronic document in which subdivisions of the electronic document are designated by tags may be used with the present invention without departing from the spirit and scope of the present invention.

In addition to having these tags designating subdivisions of an electronic document, the present invention provides metadata tags that are to be associated with the electronic document and the subdivision tags. These metadata tags designate characteristics of the subdivision that are to be used when comparing the subdivision to other electronic documents and/or subdivisions of other electronic documents. For example, these metadata tags may designate titles of subdivisions, technologies covered by the subdivisions, keywords associated with the subdivision, main ideas of the subdivision, whether examples or sample code are provided in the subsection, references associated with the subsection, and other metadata identifying the characteristics of the subsection that may be of interest when comparing subsections of documents.

The following is an example of the type of metadata tags that may be included in the markup language code of an electronic document:

```
<chapter    title="J2EE    security"    technologies_
    covered="EJB,    JSP,    JDBC,    HTTP,    Servlet",
    keywords="security, J2EE, authentication, authorization,
    SSL">
```

Chapter 10-J2EE Security
```
<paragraph  main_idea="J2EE   and   SSL",   sample_
    code_used="yes", references="some references">
```
J2EE Security comprises many pieces. This version of J2EE has been upgraded and improved to provide useful new features . . .
```
</paragraph>
</chapter>
```

Of course, in a large electronic document, such as an electronic book or magazine, there would be far more text and many more metadata tags associated with subdivisions of the large electronic document. These metadata tags may be provided by a creator of the electronic document, a publisher of the electronic document, or other authority that has access and permission to modify the original code of the electronic document to include these metadata tags and their associated values.

The metadata tags associated with the section tags of the electronic document are preferably standardized tags that are understandable by a relative relevance search engine, however the present invention is not limited to such. Rather than actually knowing the metadata tags, the relative relevance search engine may make a simple comparison between the names and values of tags of two or more electronic documents or subdivisions of electronic documents to determine those metadata tags that match for two or more electronic documents and/or subdivisions of electronic documents.

Figure 4:
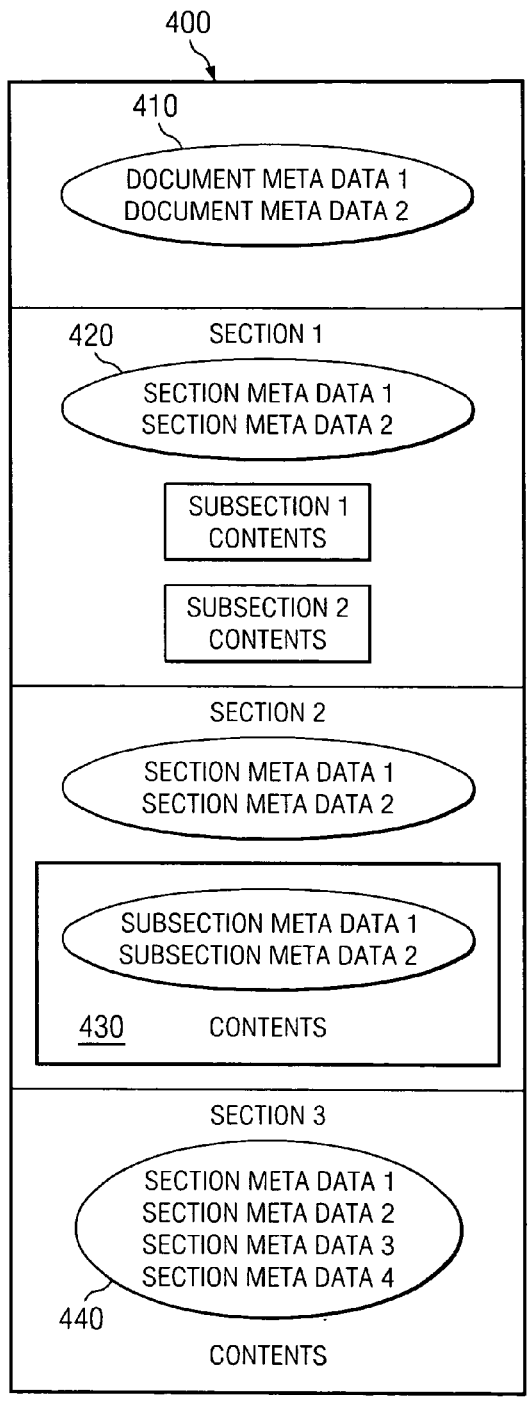
FIG. 4 is an exemplary block diagram of an electronic document having sections and metadata associated with these sections in accordance with one exemplary embodiment of the present invention.

FIG. 4 is an exemplary block diagram of an electronic document having sections and metadata associated with these sections in accordance with one exemplary embodiment of the present invention. As shown in FIG. 4, metadata tags, or simply "metadata", may be associated with various gradations of divisions of an electronic document. Some metadata 410 may be associated with the electronic document 400 as a whole and other metadata 420 may be associated with a plurality of subsections of the electronic document 400. Still further, some metadata 430 may be associated with the contents of a section of the electronic document 400. In addition, some sections of the electronic document 400 may be comprised entirely of metadata 440 associated with contents and no metadata being associated with sections as a whole.

Upon the request for similar documents to an initial or base document, a portion of the initial or base document, or in response to a search request in which search criteria are designated, metadata associated with electronic documents from one or more sources of electronic documents is retrieved. This metadata is then compared to the metadata associated with the initial or base document, the portion of the initial or base document, or the search criteria. Based on this comparison, a score is calculated for each document whose metadata is retrieved and compared to the base document or search criteria based on the weights, or modified weights, attributed to matching portions of the metadata. The scores are then used to generate a ranked list of documents which is returned to a client device.

In addition, or alternative to the comparison of the metadata of two or more documents, the present invention may perform a direct comparison of the content of the documents, selected portion of the documents, etc. This may be achieved by performing, for example, a literal comparison LCOMP operation on the content. The result would indicate a measure of matching of the two documents, portions of the documents, etc. This measure may then be weighted by an associated weight, which may itself be modified based on modifiers set forth in a rank profile, and used along with the comparison of the metadata to generate a score, as detailed hereafter.

With the present invention a user may enter a relative relevance search request using a client browser application that is augmented to provide a mechanism for entry of relative relevance search criteria. For example, the browser may be enhanced such that a user may view a document via the browser and select a function from a menu requesting other documents meeting certain relative relevance search criteria. This search criteria may be, for example, to find other documents that deal with the same subject matter as the currently displayed document, the currently displayed portion of the document, a portion of the document in which a cursor is presently located, a highlighted word or phrase in the displayed document, or other search criteria that are specifically entered by the user.

For example, a first document may be displayed using the augmented browser. During reading of the first document, a user may determine that a particular topic being covered is of additional interest to the user. As such, the user may, while reading the first document, select an option from a menu or other user interface element, to initiate a relative relevance search for other documents based on the contents of the currently displayed document. For example, the user may select an option from a menu to find other documents that contain similar metadata to the portion of the document currently displayed, the entire document, a paragraph in which the cursor is currently present, or the like.

In response to the selection of one of these options, the client side browser extracts the metadata and/or content from the code for the currently displayed electronic document for the selected portion or portions of the currently displayed electronic document and generates a relative relevance search request based on the extracted metadata and/or content. The client side browser then sends a relative relevance search request to a server through which a search engine service is provided. Alternatively, the client side browser may simply send an identifier of the document and the selection portion or portions of the document as part of the relative relevance search request with the search engine performing the extraction of metadata and/or content for the selected portions of the electronic document at a server.

In either case, the server that receives the relative relevance search request performs a search of other electronic documents registered with the search engine of the server to determine if there are any other documents relevant to the relative relevance search request criteria. These other electronic documents may be provided by one or more electronic document sources. The registration of these electronic documents with the search engine of the server may include, for example, providing the metadata and/or content for select portions of the electronic document to the search engine so that it may be used in determining which other electronic documents are relevant to the relative relevance search request criteria.

Alternatively, the metadata and/or content, or at least a portion of the metadata and/or content, for each document may be retrieved from the document source each time there is a relative relevance search request. In order to reduce the amount of traffic, however, the amount of metadata transferred from the document source to the server in order to perform the relative relevance search may be minimized by initially sending only a first portion of the metadata to the server and sending subsequent portions of the metadata only upon a determination that the already sent portion of the metadata indicates a threshold amount of relevance to the relative relevance search request criteria.

This iterative process may also be done in embodiments where the metadata is stored locally with regard to the server providing the search engine in order to speed up the search process by quickly "weeding-out" the electronic documents that have no relevance to the current relative relevance search request criteria. However, it should be noted that in order to provide the most comprehensive search, in view of the fact that subdivisions of documents may address topics that are not addressed in other subdivisions or are not the focus of the document as a whole, all of the metadata and/or content for the entire document should be used in the relative relevance search.

Once the metadata and/or content for the initial document or base document is received by the server from the client device, or extracted by the server in response to the relative relevance search request, and the metadata/content for one or more electronic documents is received from a local storage or document source, a comparison of the metadata/content may be performed to determine the relative relevance of the metadata/content of the two electronic documents. A score may then be attributed to the electronic document from the document source or that is represented by the locally stored metadata/content. This score is a measure of the relevance of the electronic document to the selected portion or portions of the initial or base document, or the search criteria entered by the user. The score may then be used to rank the electronic document relative to other electronic documents to indicate which electronic documents are more relevant than others to the selected portion or portions of the initial or base document or the search criteria entered by the user.

The score may be determined in any number of different ways. The following is only an example of how the base score may be calculated and is not intended to assert or imply any limitation on the manner by which a score may be calculated for an electronic document based on the metadata associated with portions of the electronic document.

In one exemplary embodiment, the score for a particular portion of metadata/content may be calculated by determining how many values for the portion of metadata/content match between the metadata/content for the selected portion of the initial document and metadata/content for one or more portions for another electronic document. For example, if the metadata of the initial document includes the attribute "technologies_covered" and the values for this attribute are EJB, JSP, JDBC, HTTP, and Servlet, a determination is made as to whether the metadata for one or more portions of the other electronic document match theses values. Thus, if the metadata for a portion of the other electronic document includes the attribute "technologies_covered" and has the values EJB, HTTP, and Servlet, then there are matching values determined to exist. Each matching value may be used to determine a percentage of correspondence between the portions of metadata. For example, since three out of the 5 terms in the value portion of the metadata match, the percentage of correspondence is 0.60 or 60%.

As mentioned previously, portions of metadata and/or content are given default weights that are used to represent the relative importance of the various portions of the metadata and/or content. These weights are used along with the measure of correspondence to determine a weight value for the portion of metadata/content. These default weights for portions of metadata/content of a document preferably sum to a standard number for the entire document. For example, all documents may have the sum of their weights equal to 1.0 or 100. Thus, while document A may have a total weight value of 1.0 and document B may have a total weight value of 1.0, the weights attributed to their individual portions of metadata and content may vary within the documents.

In addition, based on a rank profile, different portions of the document may have their default weights modified such that different weights are associated with each portion of the metadata/content than was set by the default weights. This allows a user or search engine provider to reassign weights within documents based on a personal preference of the user and/or search engine provider. This rank profile may be established by the search engine provider or may be a custom rank profile established by a user of a client device and stored in a profile for the user that is associated with the search engine.

In the above example, assume that the default weight for the portion of metadata is 0.3. Using the default weight, the product of the weight and the measure of correspondence, i.e. the score for this portion of metadata, is determined to be 0.18 (i.e. 0.3*0.6). Now assume that a user wishes to modify the default weight and instead, assigns a weight of 0.5 to the portion of metadata set forth above. The resulting score for this portion is determined to be 0.30 (i.e. 0.5*0.6).

The measure of correspondence between the metadata/content of the two documents, the weights associated with the portions of the metadata/content being compared, and the modifiers to these weights are all combined to generate an overall score for the document or portions of the document that are being considered in the comparison to the base document, portions of the base document, or search criteria. The scores for a plurality of documents are then compared to generate the ranked list of documents.

The following is an example of how a weighted score may be calculated for electronic documents using the present invention. The following example is not meant to state or imply any limitation on the manner by which a weighted score may be calculated for electronic documents and is offered only as an example.

With the present invention, the weight of a section, e.g., a subdivision, of an electronic document is equal to the sum of the weight of the section's metadata and the weight of its contents. This is represented as:

$$W_{section} = W_{meta} + W_{content} \tag{1}$$

where $W_{section}$ is the weight for the section, $W_{meta}$ is the weight attributed to the metadata of the section, and $W_{content}$ is the weight attributed to the content of the section.

The weight of a section's metadata is equal to the sum of the weights of all the name-value pairs that match. That is, metadata attributes are presented as name-value pairs, e.g., technologies_covered="EJB". The name-value pairs that match between the initial or base electronic document metadata for the selected portion and the metadata for the section of the other document increase the weight of the section. If all of the name-value pairs in the metadata for the initial document and the other document match, then the sum of those weights will yield a high section metadata weight.

As mentioned above, there may be a measure of correspondence associated with metadata. That is, the name-value pairs may partially match and thus, the weight used in the following equations may be a product of the weight value attributed to the portion of the metadata and the measure of correspondence.

The equation for determining the weight of the metadata is illustrated by:

$$W_{meta} = \sum_{i=1}^{n} W_{pair}(i) \quad (2)$$

where i is the current name-value pair, $W_{meta}$ is the weight attributed to the metadata of the section, $W_{pair}$ is the weight attributed to the name-value pairs, and n is the number of name-value pairs.

The weight of a section's content is equal to the sum of the weights of all of the subsections of that section. Thus, the weight attributed to the content of a section may be found using the following equation:

$$W_{content} = \sum_{i=1}^{p} W_{subsection}(i) \quad (3)$$

where $W_{content}$ is the weight of the section attributed to the contents of the section, $W_{subsection}$ is the weight of the metadata associated with the subsections of the section, and p is the number of subsections in the section.

Using the above equations (1), (2) and (3), for any section, the weight of that section may be obtained using the following equation:

$$W_{section} = \sum_{i=1}^{m} W_{meta}(i) + \sum_{j=1}^{p} W_{subsection}(j) \quad (4)$$

where $W_{section}$ is the weight of the section, $W_{meta}$ is the weight of the section metadata, and $W_{subsection}$ is the weight of the metadata for each subsection of the section.

Summing the weights for all of the sections of an electronic document, such as a book, results in a weight for the entire electronic document:

$$W_{doc} = \quad (5)$$

$$W_{doc-meta} + W_{doc-content} = \sum_{i=1}^{m} W_{doc-meta}(i) + \sum_{j=1}^{p} W_{doc-section}(j)$$

where $W_{doc}$ is the weight of the entire document, $W_{doc-meta}$ is the weight of the document attributed to the document metadata, $W_{doc-content}$ is the weight of the document attributed to the contents of the document, m is the number of metadata name-value pairs in the document metadata, e.g., the global metadata, p is the number of sections in the document, and $W_{doc-section}$ is the weight of each section of the document. This equation simply states that the weight of the entire electronic document equals the weight of the document's metadata, e.g., the global document metadata, plus the weights of the contents of each section of the electronic document.

It should be noted that the relevance ranking based on weights is not limited to the entire electronic document. Rather, the relevance of individual portions of the electronic document may be determined utilizing the above methodology and rankings provided based only on selected portions of documents.

When comparing any two sections of two electronic documents, the result is a calculation of the weight of the metadata for both sections times the comparison of each section's metadata, plus the content comparison multiplied by the two content's weights. Thus, the comparison of any two sections of two electronic documents may be represented as:

$$Comp(s_a, s_b) = W_{meta}(a)*W_{meta}(b)*Comp(m_a, m_b) + W_{content}(a)*W_{content}(b)*Comp(c_a, c_b) \quad (6)$$

where $Comp(s_a, s_b)$ is the comparison of two sections $s_a$ and $s_b$, $W_{meta}(a)$ is the weight of the metadata for section $s_a$, $W_{meta}(b)$ is the weight of the metadata for section $s_b$, $Comp(m_a, m_b)$ is the comparison of the metadata for section $s_a$ to the metadata for section $s_b$, $W_{content}(a)$ is the weight of the content of section $s_a$, $W_{content}(b)$ is the weight of the content of section $s_b$, and $Comp(c_a, c_b)$ is the comparison of the contents for sections $s_a$ and $S_b$. By way of example, assume that a first document has a first section $s_a$ and a second document has a section $s_b$ that is being compared to $s_a$. The weight assigned to the metadata for section $s_a$ is 0.3 after any adjustments due to a rank profile if any. The weight assigned to the metadata for section $s_b$ is 0.4 after any adjustments due to a rank profile if any. The textual comparison of section $s_a$ to section $s_b$ results in a Comp value that identifies a measure of correspondence, such as a percentage of the text that matches, e.g., 0.70. Similar values may be provided for the content of the sections $s_a$ and $s_b$ such that the weights are 0.5 for the content of $s_a$, 0.3 for the content of section $s_b$, and the correspondence measure is, for example, 0.60. The result of the above equation would give the following score or measure of relevance:

$$Comp(s_a, s_b) = 0.3*0.4*0.7 + 0.5*0.3*0.6 = 0.174$$

This value may then be compared to other similarly obtain values for other sections of the same or different documents to determine which sections are more relevant to section $s_a$ than others. Alternatively, the Comp values for selected sections of a document may be summed to generate a score for the entire document.

The comparison of two portions of metadata may be performed using the following equation:

$$Comp(m_a, m_b) = \quad (7)$$

$$\sum_{i=1, j=1}^{m,n} W_{a-pair}(i) * W_{b-pair}(j) * LComp[n_a(i), n_b(j)] +$$

$$LComp[v_a(i), v_b(j)]$$

where $n_a$ and $n_b$ are the metadata names for sections $s_a$ and $s_b$, $v_a$ and $v_b$ are the values associated with the names for sections $s_a$ and $s_b$, LComp is a literal string comparison function that is generally known in the art, $W_{a-pair}$ and $W_{b-pair}$ are the weights associated with the name-value pairs for sections $s_a$ and $s_b$, m is the number of name-value pairs for section $s_a$ and n is the number of name-value pairs for the section $s_b$.

When section a and section b have subsections, the comparison value $Comp(c_a, c_b)$ of the contents of sections $s_a$ and $s_b$ is determined using the following equation:

$$Comp(c_a, c_b) = \quad (8)$$

$$\sum_{i=1, j=1}^{m,n} W_{a-section}(i) * W_{b-section}(j) * Comp[s_a(i), s_b(j)]$$

where $c_a$ is the contents of section $s_a$, $c_b$ is the contents of section $s_b$, $W_{a\text{-}section}$ is the weight for the subsections of section $s_a$, $W_{b\text{-}section}$ is the weight for the subsections of section $s_b$, $Comp[s_a(i),s_b(j)]$ is the comparison value obtained from a comparison of the subsections of section $s_a$ and the subsections of section $s_b$, m is the number of subsections in section $s_a$, and n is the number of subsections in section $s_b$.

When section $s_a$ and section $s_b$ do not have subsections, the comparison value Comp(ca,cb) of the contents of sections $s_a$ and $s_b$ is determined using the following equation:

$$Comp(c_a,c_b)=W_{ca}*W_{cb}*LComp[c_a,c_b] \qquad (9)$$

where $c_a$ is the contents of section $s_a$, $c_b$ is the contents of section $s_b$, $W_{ca}$ is the weight of the contents of section $s_a$, $W_{cb}$ is the weight of the contents of section $s_b$, and LComp $[c_a,c_b]$ is a literal string comparison of the metadata for the contents $c_a$ and $c_b$.

The comparison of two documents, e.g., documents $D_a$ and $D_b$, may then be made by using the following equation:

$$Comp(D_a, D_b)=W_{doc\text{-}meta}(a)*W_{doc\text{-}meta}(b)* \\ Comp(m_{a\text{-}doc}, m_{b\text{-}doc})+W_{doc\text{-}content}(a)* \\ W_{doc\text{-}content}(b)*Comp(c_{a\text{-}doc},c_{b\text{-}doc}) \qquad (10)$$

The equations above show how the relevance rankings may be produced in accordance with one exemplary embodiment of the present invention. The weights (W) in the equations can be changed based on the weight modifiers or replacement weights designated in the rank profile. The rank profile may be customizable by a user so that an individual rank profile may be generated for each user and stored in association with the search engine of the present invention.

Once scores, e.g. Comp function values, for each other electronic document of interest are calculated, the scores may be ordered based on their values to determine which electronic documents are most relevant to the one or more portions of the initial document selected and identified in the relative relevance search request criteria. The ordered list of documents may then be provided to a client device so that the list may be displayed to a user via a browser or other graphical user interface. The user may then select a document from the list in order to initiate download of the content of the selected document to the client device.

FIG. 5 is an exemplary message flow in accordance with one exemplary embodiment of the present invention. This message flow outlines the process described above. As shown in FIG. 5, a client 510 sends a request for an initial document to a server 520 that provides a search engine service. The server 520 sends a request for the initial document to a document source 540 which then returns the initial document data to the server 520. The server 520 forwards this initial document data to the client device 510 where it is displayed on the client device using a browser application.

At some time later, while viewing the initial document, a user of the client device 510 selects the document, a portion of the document, or enters his/her own relative relevance search criteria using the browser application. The user then initiates a relative relevance search request which is sent to the server 520. The server 520 forwards the relative relevance search request to the relative relevance search engine 530. The relative relevance search engine 530 requests metadata and/or content information for registered electronic documents from the document source 540. As mentioned above, in an alternative embodiment, the metadata and/or content for these documents may be stored locally so that it need not be requested from the document source 540.

The document source 540 returns the metadata and/or content for the registered electronic documents to the relative relevance search engine 530. As previously mentioned, in some embodiments, this may be an iterative operation in which small portions of the metadata and/or content are transmitted with subsequent transmissions only occurring with regard to a particular document if it is determined that the document is relevant to the current relative relevance search request criteria.

The metadata/content for the documents that was retrieved is compared to the metadata/content for the document, portion or portions of the document, or the search criteria submitted in the relative relevance search request. Scores values are determined for each of the documents based on their metadata and/or content and the weights associated with the metadata/content. The documents are then ordered based on the values of the scores. In this way, the documents are ranked in accordance with their relevance to the initial document, the selected portions of the initial document, or the search criteria entered by the user.

The ranked list of documents is provided to the server 520 which then forwards the list to the client device 510. The user of the client device 510 may select a document from the list to thereby initiate download of the data corresponding to the selected document. As a result, a request for the selected document is sent from the server 520 to the document source 540 which returns the selected document data to the server 520. The server 520 then forwards the data to the client device 510 where the selected document is displayed to the user.

Figure 6:
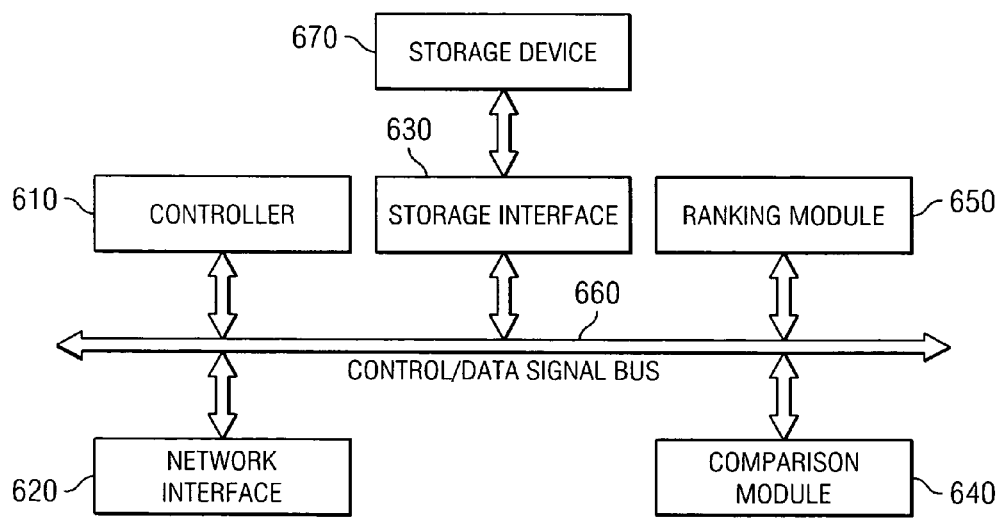
FIG. 6 is an exemplary block diagram of a relative relevance search engine in accordance with one exemplary embodiment of the present invention.

FIG. 6 is an exemplary block diagram of a relative relevance search engine in accordance with one exemplary embodiment of the present invention. The elements shown in FIG. 6 may be implemented as hardware, software, or any combination of hardware and software. In a preferred embodiment, the elements of FIG. 6 are implemented as software instructions executed by one or more data processing devices.

As shown in FIG. 6, the relative relevance search engine includes a controller 610, a network interface 620, a storage interface 630, a comparison module 640, and a ranking module 650. The elements 610-650 are in communication with one another via the control/data signal bus 660. Although a bus architecture is shown in FIG. 6, the present invention is not limited to such and any architecture that facilitates the communication of control/data signals between the elements 610-650 may be used without departing from the spirit and scope of the present invention.

The controller 610 controls the overall operation of the relative relevance search engine and orchestrates the operation of the other elements 620-650. The network interface 620 provides a communication interface through which relative relevance search requests may be received from client devices, requests for document metadata/content may be sent, document metadata/content may be received, and the results of the relative relevance searches may be sent to client devices.

The storage interface 630 provides a communication interface for storing metadata/content associated with documents in a storage device 670. This may be metadata/content that is stored temporarily in order to facilitate the comparisons of metadata and/or content for portions of the electronic documents or a more permanent storage of metadata/content for later retrieval in order to perform such comparisons. In either case, the storing and retrieval of metadata/content to and from the storage device 670, either on a temporary or more permanent basis, is performed via the storage interface 630.

The comparison module 640 performs the functions previously described for comparing the metadata and/or content associated with the documents and subdivisions of the documents in order to calculate a score for the subdivisions of the document and/or the documents themselves. The comparison module 640 compares the metadata and/or content retrieved for one or more electronic documents against the metadata and/or content designated in the relative relevance search request for an initial or base document, one or more selected portions of an initial or base document, or search criteria explicitly entered by a user of a client device that sent the relative relevance search request. Based on the comparison, and weight values associated with the metadata/content, scores are calculated for the one or more documents. These scores are then provided to the ranking module 650.

The ranking module 650 ranks the one or more documents based on the scores. For example, a greatest to least value listing may be generated where documents that are most relevant to the initial document, one or more selected portions of the initial document, or the search criteria, are listed first in the ranked list. Other organizations of the ranked list, such as least relevant to most relevant, may be utilized without departing from the spirit and scope of the present invention.

The controller 610 may receive the ranked list from the ranking module 650 and send the ranked list to a source of the relative relevance search request via the network interface 620. In this way, the user of the client device that transmitted the relative relevance search request is presented with a listing of documents in relevance order as determined based on a weighted comparison of the metadata of the documents to the initial document, portions of the initial document, or search criteria entered by the user.

Figure 7:
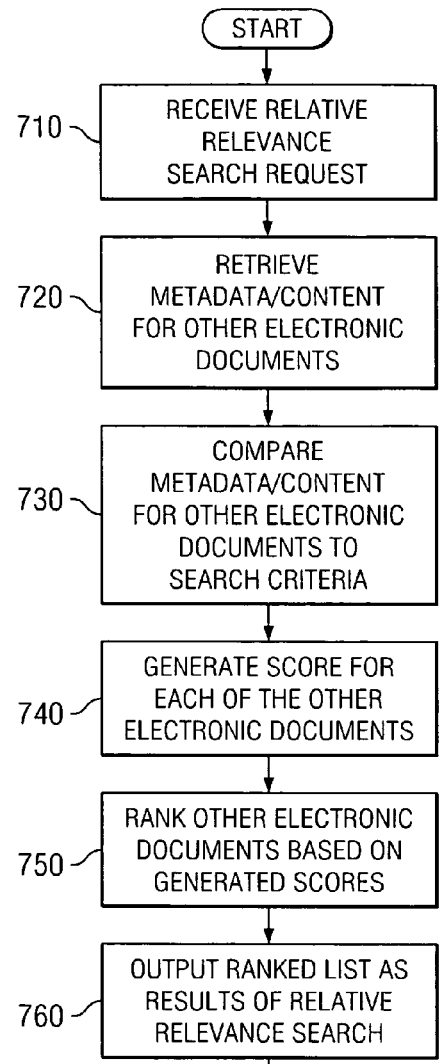
FIG. 7 is a flowchart outlining an exemplary operation of one embodiment of the present invention.

FIG. 7 is a flowchart outlining an exemplary operation of one embodiment of the present invention. It will be understood that each block of the flowchart illustration, and combinations of blocks in the flowchart illustration, can be implemented by computer program instructions. These computer program instructions may be provided to a processor or other programmable data processing apparatus to produce a machine, such that the instructions which execute on the processor or other programmable data processing apparatus create means for implementing the functions specified in the flowchart block or blocks. These computer program instructions may also be stored in a computer-readable memory or storage medium that can direct a processor or other programmable data processing apparatus to function in a particular manner, such that the instructions stored in the computer-readable memory or storage medium produce an article of manufacture including instruction means which implement the functions specified in the flowchart block or blocks.

Accordingly, blocks of the flowchart illustration support combinations of means for performing the specified functions, combinations of steps for performing the specified functions and program instruction means for performing the specified functions. It will also be understood that each block of the flowchart illustration, and combinations of blocks in the flowchart illustration, can be implemented by special purpose hardware-based computer systems which perform the specified functions or steps, or by combinations of special purpose hardware and computer instructions.

As shown in FIG. 7, the operation starts by receiving a relative relevance search request in which search criteria are designated (step 710). This search criteria may be the metadata and/or content for an entire initial document, metadata and/or content associated with one or more selected portions of an initial document, or search criteria specifically entered by a user, for example.

Metadata/content for other electronic documents is then retrieved (step 720). The metadata/content for the other electronic documents is compared to the search criteria (step 730) and a score is generated for each of the other electronic documents (step 740). As described above, the calculation of a score may involve comparing the metadata/content of each other electronic document to the metadata/content of the initial electronic document, one or more selected portions of the initial electronic document, or user entered metadata/content type search criteria, and generating a score based on the weights associated with these portions of metadata/content and a measure of the correspondence between these portions of metadata/content. This may be done based on the metadata/content for the entire document, the metadata/content for individual sections, and/or the metadata/content for individual subsections, as discussed above. The weighted values obtained for each selected section and subsection of the documents may be summed to arrive at a score for a section of the electronic document and/or for the electronic document as a whole.

The other electronic documents are then ranked based on the calculated scores (step 750). The ranked list is then returned as the results of the relative relevance search (step 760) and the operation terminates.

Thus, the present invention provides a mechanism by which portions of a document may be selected and other documents relevant to the selection portions of the document may be identified. The identification of these other documents is based on a measure of the correspondence of metadata and/or content associated with the documents, weights associated with the metadata/content, and modifications to these weights provided in a rank profile. In this way, various granularities of a document may be used to identify other documents of interest to a user. The identification of the other documents may be based on an analysis of the entire document or portions of the document rather than merely being based on an abstract of the document. In this way, a more accurate identification of relevant documents is achieved than is achievable by known search mechanisms.

It should be noted that while the present invention has been described in terms of both the metadata and the content being compared between documents in order to arrive at a score for the document, the present invention is not limited to such embodiments. Rather, the present invention may compare only metadata or only content without departing from the spirit and scope of the present invention. In such embodiments, for example, the weights associated with metadata or the weights associated with content in the equations set forth above may be set to zero in order to eliminate these portions of the equation from influencing the resulting score. The result is a set of equations that either only take into account the comparison of the metadata or the comparison of the content. Alternatively, the equations themselves may be modified to eliminate the quantities associated with either metadata or content depending on the embodiment.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method, in a data processing system, of identifying relevant documents to a portion of a first document, comprising:
   receiving an identification of a portion of a first document from a client device;
   identifying metadata associated with the portion of the first document;
   retrieving metadata for a portion of a second document;
   comparing the metadata associated with the portion of the first document to the metadata for the portion of the second document;
   determining a relative relevance of the portion of the second document to the portion of the first document based on the comparison, wherein determining a relative relevance of the portion of the second document to the portion of the first document includes generating a correspondence value based on the comparison of the metadata associated with the portion of the first document to the metadata associated with the portion of the second document and generating a score value for the portion of the second document based on the correspondence value for the portion of the second document;
   comparing content of the portion of the first document to content of the portion of the second document;
   generating a content value for the portion of the second document based on the comparison of the content, wherein the correspondence value and the content value for the portion of the second document are combined to obtain the generated score value;
   ranking the second document relative to other documents that have been compared to the first document based on the generated score value to obtain a ranked list of documents; and
   outputting the ranked list of documents to the client device;
   wherein one or more first weights are associated with the portion of the first document, one or more second weights are associated with the portion of the second document, and wherein generating a score value for the portion of the second document based on the correspondence value for the portion of the second document includes applying the one or more first weights and the one or more second weights to the correspondence value and the content value, and wherein the score value is calculated using the following equation:

$$Comp(D_a, D_b) = W_{doc\text{-}meta}(a) * W_{doc\text{-}meta}(b) * Comp(m_{a\text{-}doc}, m_{b\text{-}doc}) + W_{doc\text{-}content}(a) * W_{doc\text{-}content}(b) * Comp(c_{a\text{-}doc}, c_{b\text{-}doc})$$

where $Comp(D_a, D_b)$ is a comparison value for a comparison of a portion of a first document $D_a$ and a second document $D_b$, $W_{doc\text{-}meta}(a)$ represents one or more first weights associated with metadata of the portion of the first document, $W_{doc\text{-}meta}(b)$ represents one or more second weights associated with metadata of the portion of the second document. $Comp(m_{a\text{-}doc}, m_{b\text{-}doc})$ is a comparison value associated with a comparison of the metadata for a portion of a first document $m_{a\text{-}doc}$ and the metadata for a portion of a second document $m_{b\text{-}doc}$, $W_{doc\text{-}content}(a)$ represents one or more first weights associated with content of the portion of the first document, $W_{doc\text{-}content}(b)$ represents one or more second weights associated with content of the portion of the second document, and $Comp(c_{a\text{-}doc}, c_{b\text{-}doc})$ is a comparison value obtained from comparing the content of the portion of the first document $c_{a\text{-}doc}$ to the content of the portion of the second document $c_{b\text{-}doc}$.

2. The method of claim 1, wherein the portion of the first document is one of the entire first document, a chapter of the first document, a paragraph of the first document, a subdivision of the first document, and a search term.

3. The method of claim 1, wherein the portion of the second document is at least one of an entire portion of the one or more second documents, a chapter of the one or more second documents, a paragraph of the one or more second documents, and a subdivision of the one or more second documents.

4. The method of claim 1, wherein one or more first weights are associated with the portion of the first document, one or more second weights are associated with the portion of the second document, and wherein generating a score value for the portion of the second document based on the correspondence value for the portion of the second document includes applying the one or more first weights and the one or more second weights to the correspondence value.

5. The method of claim 1, further comprising:
   retrieving one or more weight modifiers from a profile; and
   applying the one or more weight modifiers to one or more of the first weights and the second weights.

6. Computer program instructions stored in a computer recordable-type media for identifying documents relevant to a portion of a first document, said computer program instructions comprising:
   first instructions for receiving an identification of a portion of a first document from a client device;
   second instructions for identifying metadata associated with the portion of the first document;
   third instructions for retrieving metadata for a portion of a second document;
   fourth instructions for comparing the metadata associated with the portion of the first document to the metadata for the portion of the second document;
   fifth instructions for determining a relative relevance of the portion of the second document to the portion of the first document based on the comparison, wherein the fifth instructions for determining a relative relevance of the portion of the second document to the portion of the first document includes instructions for generating a correspondence value based on the comparison of the metadata associated with the portion of the first document to the metadata associated with the portion of the second document and instructions for generating a score value for the portion of the second document based on the correspondence value for the portion of the second document;

sixth instructions for comparing content of the portion of the first document to content of the portion of the second document; and seventh instructions for generating a content value for the portion of the second document based on the comparison of the content, wherein the correspondence value and the content value for the portion of the second document are combined to obtain the generated score value;

wherein one or more first weights are associated with the portion of the first document, one or more second weights are associated with the portion of the second document, and wherein the instructions for generating a score value for the portion of the second document based on the correspondence value for the portion of the second document include instructions for applying the one or more first weights and the one or more second weights to the correspondence value and the content value, and wherein the score value is calculated using the following equation:

$$Comp(D_a,D_b) = W_{doc\text{-}meta}(a) * W_{doc\text{-}meta}(b) * Comp(m_{a\text{-}doc}, m_{b\text{-}doc}) + W_{doc\text{-}content}(a) * W_{doc\text{-}content}(b) * Comp(c_{a\text{-}doc}, c_{b\text{-}doc})$$

where $Comp(D_a, D_b)$ is a comparison value for a comparison of a portion of a first document $D_a$ and a second document $D_b$, $W_{doc\text{-}meta}(a)$ represents one or more first weights associated with metadata of the portion of the first document, $W_{doc\text{-}meta}(b)$ represents one or more second weights associated with metadata of the portion of the second document, $Comp(m_{a\text{-}doc}, m_{b\text{-}doc})$ is a comparison value associated with a comparison of the metadata for a portion of a first document $m_{a\text{-}doc}$ and the metadata for a portion of a second document $m_{b\text{-}doc}$, $W_{doc\text{-}content}(a)$ represents one or more first weights associated with content of the portion of the first document, $W_{doc\text{-}content}(b)$ represents one or more second weights associated with content of the portion of the second document, and $Comp(c_{a\text{-}doc}, c_{b\text{-}doc})$ is a comparison value obtained from comparing the content of the portion of the first document $c_{a\text{-}doc}$, to the content of the portion of the second document $c_{b\text{-}doc}$.

7. The computer program instructions of claim 6, further comprising:

instructions for ranking the second document relative to other documents that have been compared to the first document based on the generated score value to obtain a ranked list of documents; and instructions for providing the ranked list to the client device.

8. The computer program instructions of claim 6, wherein the portion of the first document is one of the entire first document, a chapter of the first document, a paragraph of the first document, a subdivision of the first document, and a search term.

9. The computer program instructions of claim 6, wherein the portion of the second document is at least one of an entire portion of the one or more second documents, a chapter of the one or more second documents, a paragraph of the one or more second documents, and a subdivision of the one or more second documents.

10. The computer program instructions of claim 6, wherein one or more first weights are associated with the portion of the first document, one or more second weights are associated with the portion of the second document, and wherein the instructions for generating a score value for the portion of the second document based on the correspondence value for the portion of the second document include instructions for applying the one or more first weights and the one or more second weights to the correspondence value.

11. The computer program instructions of claim 6, further comprising:

instructions for retrieving one or more weight modifiers from a profile; and instructions for applying the one or more weight modifiers to one or more of the first weights and the second weights.

12. An apparatus for identifying documents relevant to a portion of a first document, comprising:

means for receiving an identification of a portion of a first document from a client device;

means for identifying metadata associated with the portion of the first document;

means for retrieving metadata for a portion of a second document;

means for comparing the metadata associated with the portion of the first document to the metadata for the portion of the second document;

means for determining a relative relevance of the portion of the second document to the portion of the first document based on the comparison, wherein the means for determining a relative relevance of the portion of the second document to the portion of the first document includes means for generating a correspondence value based on the comparison of the metadata associated with the portion of the first document to the metadata associated with the portion of the second document and means for generating a score value for the portion of the second document based on the correspondence value for the portion of the second document;

means for comparing content of the portion of the first document to content of the portion of the second document; and means for generating a content value for the portion of the second document based on the comparison of the content, wherein the correspondence value and the content value for the portion of the second document are combined to obtain the generated score value;

wherein one or more first weights are associated with the portion of the first document, one or more second weights are associated with the portion of the second document, and wherein the means for generating a score value for the portion of the second document based on the correspondence value for the portion of the second document include means for applying the one or more first weights and the one or more second weights to the correspondence value and the content value, and wherein the score value is calculated using the following equation:

$$Comp(D_a,D_b) = W_{doc\text{-}meta}(a) * W_{doc\text{-}meta}(b) * Comp(m_{a\text{-}doc}, m_{b\text{-}doc}) + W_{doc\text{-}content}(a) * W_{doc\text{-}content}(b) * Comp(c_{a\text{-}doc}, c_{b\text{-}doc})$$

where Comp($D_a$, $D_b$) is a comparison value for a comparison of a portion of a first document $D_a$ and a second document $D_b$, $W_{doc-meta}(a)$ represents one or more first weights associated with metadata of the portion of the first document, $W_{doc-meta}(b)$ represents one or more second weights associated with metadata of the portion of the second document, Comp($m_{a-doc}$, $m_{b-doc}$) is a comparison value associated with a comparison of the metadata for a portion of a first document $m_{a-doc}$ and the metadata for a portion of a second document $m_{b-doc}$, $W_{doc-content}(a)$ represents one or more first weights associated with content of the portion of the first document, $W_{doc-content}(b)$ represents one or more second weights associated with content of the portion of the second document, and Comp($c_{a-doc}$, $c_{b-doc}$) is a comparison value obtained from comparing the content of the portion of the first document $c_{a-doc}$ to the content of the portion of the second document $c_{b-doc}$.

* * * * *